(12) United States Patent
Schadow et al.

(10) Patent No.: US 10,691,096 B2
(45) Date of Patent: Jun. 23, 2020

(54) SYSTEM HAVING AT LEAST ONE HMI MODULE

(71) Applicant: Robert Bosch GmbH, Stuttgart (DE)

(72) Inventors: Joachim Schadow, Stuttgart (DE); Florian Esenwein, Leinfelden-Echterdingen (DE); Thomas Schomisch, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 229 days.

(21) Appl. No.: 15/520,992

(22) PCT Filed: Nov. 18, 2015

(86) PCT No.: PCT/EP2015/076932
§ 371 (c)(1),
(2) Date: Apr. 21, 2017

(87) PCT Pub. No.: WO2016/096301
PCT Pub. Date: Jun. 23, 2016

(65) Prior Publication Data
US 2017/0336773 A1 Nov. 23, 2017

(30) Foreign Application Priority Data

Dec. 16, 2014 (DE) .................. 10 2014 226 051

(51) Int. Cl.
*G05B 19/18* (2006.01)
*B25F 5/00* (2006.01)
(Continued)

(52) U.S. Cl.
CPC .............. *G05B 19/182* (2013.01); *B25F 5/00* (2013.01); *G05B 19/188* (2013.01); *G06F 3/1446* (2013.01); *H04Q 5/22* (2013.01)

(58) Field of Classification Search
CPC ....... G05B 19/182; G05B 19/188; B25F 5/00; G06F 3/1446; H04Q 5/22
See application file for complete search history.

(56) References Cited

U.S. PATENT DOCUMENTS

2009/0254203 A1* 10/2009 Gerold ................ B25C 1/08
700/87
2010/0091394 A1* 4/2010 DeWind ............. B60R 1/12
359/838
(Continued)

FOREIGN PATENT DOCUMENTS

CN 102596515 A 7/2012
CN 102666024 A 9/2012
(Continued)

OTHER PUBLICATIONS

International Search Report corresponding to PCT Application No. PCT/EP2015/076932, dated Feb. 12, 2016 (German and English language document) (7 pages).

*Primary Examiner* — Thomas C Lee
*Assistant Examiner* — Michael Tang
(74) *Attorney, Agent, or Firm* — Maginot, Moore & Beck LLP

(57) ABSTRACT

In one embodiment, a system includes a HMI module. The HMI module includes a first external application unit that has first external application unit. The first external application unit has a first interface for the HMI module. The HMI module further includes a second external application unit that has a second interface for the HMI module. The HMI module can correspond with both the first interface and the second interface.

18 Claims, 6 Drawing Sheets

(51) Int. Cl.
*G06F 3/14* (2006.01)
*H04Q 5/22* (2006.01)

(56) References Cited

U.S. PATENT DOCUMENTS

| | | | | |
|---|---|---|---|---|
| 2010/0217188 A1* | 8/2010 | Lampropoulos | .. | A61M 25/1018 |
| | | | | 604/97.03 |
| 2013/0107142 A1* | 5/2013 | Shirasaka | ................ | H04N 5/64 |
| | | | | 348/843 |
| 2014/0070924 A1* | 3/2014 | Wenger | ..................... | B25F 5/00 |
| | | | | 340/10.1 |
| 2015/0316913 A1* | 11/2015 | Rickey | ................... | G05B 15/02 |
| | | | | 700/180 |
| 2016/0167186 A1* | 6/2016 | Chan | ..................... | B23Q 15/20 |
| | | | | 173/2 |
| 2016/0311094 A1* | 10/2016 | Mergener | ................. | B25F 5/00 |

FOREIGN PATENT DOCUMENTS

| | | | | |
|---|---|---|---|---|
| EP | 2 072 192 A1 | | 6/2009 | |
| EP | 2072192 A1 | * | 6/2009 | ............. B25F 5/00 |
| FR | 2 916 320 A1 | | 11/2008 | |
| JP | 2008-199603 A | | 8/2008 | |
| WO | WO-2009138269 A1 | * | 11/2009 | ............. B25F 5/021 |
| WO | 2012/134469 A1 | | 10/2012 | |
| WO | 2014/008627 A1 | | 1/2014 | |
| WO | 2014/170236 A1 | | 10/2014 | |

* cited by examiner

SYSTEM HAVING AT LEAST ONE HMI MODULE

This application is a 35 U.S.C. § 371 National Stage Application of PCT/EP2015/076932, filed on Nov. 18, 2015, which claims the benefit of priority to Serial No. DE 10 2014 226 051.5, filed on Dec. 16, 2014 in Germany, the disclosures of which are incorporated herein by reference in their entirety.

The disclosure relates to a system having at least one HMI module.

BACKGROUND

Summary

The system according to the disclosure, having the features of the independent claim, comprises at least one first human-machine interface (HMI) module, which can correspond with at least one first external application unit. "Correspond" is to be understood to mean here, in particular, that the HMI module can be mounted, disposed, or the like, on or in the first external application unit. An "external application unit" is to be understood to mean a functional object, a unit composed of a plurality of functional objects, or a system of functional objects. Advantageously, the external application unit is a first hand-held power tool. It is also conceivable, however, for the external application unit to be a work means, a tool, a tool case or a tool box, an item of clothing, in particular in protective work clothing, a rechargeable battery, an electrical device, an electronic device and/or a data processing device, a measuring device or a production facility.

Advantageously, the first external application unit has at least one first interface.

Furthermore, the system has at least one second external application unit, advantageously a second hand-held power tool. The second external application unit has at least one second interface.

It is proposed that the HMI module can correspond both with the first interface and with the second interface. Thus, advantageously, the HMI module can be connected to a variety of external application units. This renders possible a modular structure of an external application unit such as, for example, a hand-held power tool. The term "modular structure" is to be understood here to mean a structure, in particular, according to a modular design principle. This means that the HMI module can be assembled with a multiplicity of differing external application units. This modular structure renders possible simple and inexpensive assembly.

Advantageous developments of the system as claimed in claim 1 are rendered possible by the features stated in the dependent claims.

Advantageously, the first interface and the second interface are mechanical interfaces. A mechanical interface is to be understood here to mean, in particular, the contact surface of the external application unit that can come into contact with an external contact surface. Thus, particularly advantageously, the HMI module can be connected both to the first application and to the second application unit.

The HMI module can be connected, in particular separably, to a variety of external application units. For this purpose, the first external application unit advantageously has at least one first housing, wherein the first housing advantageously has a recess. The recess of the first housing part is designed, advantageously, to be connected to the HMI module.

Advantageously, the HMI module has at least one optical indicating device. An optical indicating device is to be understood here to mean, in particular, a device that visually indicates information by means of a light indication, a digital indication, a display, or the like.

Advantageously, the optical indicating device is realized by an illumination device, a display or a projection device. An illumination device is to be understood to mean, in particular, a device that visually indicates information by the emission of visible light.

Visible light is to be understood here to mean, in particular, light that, in particular, has the following indications:
- a change in the light color
- a change in the light intensity
- light pulses of differing length
- light pulses of differing brightness
- running light, which change in the running direction of the light
- light pulses, varying in pulse frequency and/or brightness A projection device is to be understood to mean, in particular, a device that projects information into an environment of the optical indicating device.

Advantageously, the HMI module has at least one operating element. It is proposed that the operating element be realized by a switch, an adjusting element, a sensor element, a contactless switch, or the like.

Advantageously, an external application unit can thereby be operated via the HMI module.

Advantageously, the HMI module has at least one communication unit, for establishing a data transmission connection. Advantageously, data can thereby be transmitted from the HMI module to an external data processing unit. A "communication unit" is to be understood to mean, in particular, a component that enables data to be transmitted from the HMI module to an external data processing unit. The communication unit is preferably realized as a wireless communication unit. The communication unit in this case may be realized as a WLAN communication unit, as a Bluetooth communication unit, as a radio communication unit, as an RFID communication unit, as an NFC communication unit, as an infrared communication unit, as a mobile telephony communication unit, or the like. Advantageously, the communication unit is designed for bidirectional data transmission. In an alternative design, the communication unit is realized as a wired communication unit, such as, for example, as a LAN communication unit, as a USB communication unit, or the like.

Advantageously, the HMI module has at least one sensor unit. The sensor unit may be equipped with at least one sensor, which is designed to sense at least one characteristic quantity and convert it into at least one sensor signal.

Advantageously, the at least one sensor may be realized as one of the following applications: as a displacement sensor, as an acceleration sensor, as a motion detector, as a rotation-rate sensor, as a pressure sensor, as a humidity sensor, as a gas sensor, as a position sensor as a light sensor, as a proximity switch, as a sound sensor, as a temperature sensor, as a magnetic field sensor, as a locating sensor, or the like.

Advantageously, the HMI module has at least one storage unit. A storage unit is to be understood to mean a data storage or a storage medium for storing data, in particular electronic data.

Furthermore, the HMI module has at least one data processing unit. A data processing unit is to be understood to mean a component, such as an electronic component, for example a transistor, or a component unit, such as an integrated circuit by which data is sensed, processed according to a predefined method and output, as an output result.

Advantageously, the HMI module has at least one rechargeable battery. The rechargeable battery is designed to store electrical energy and to deliver it as required to the HMI module.

The first external application unit comprises at least one first electronic unit. The electronic unit is preferably designed to control the external application unit by open-loop and/or closed-loop control, to store and/or evaluate data, and/or to communicate with other electronic units.

It is proposed that the external application unit be realized as a mains-operated hand-held power tool.

Furthermore, it is proposed that the external application unit be realized as a battery-operated hand-held power tool.

Preferably, the hand-held power tool is realized in at least one of the following embodiment:
a. angle grinder
b. random-orbit sander
c. straight grinder
d. sander
e. oscillating multitool
f. router
g. electric scraper
h. jigsaw
i. circular saw
j. riveter
k. belt sander
l. screwdriver/drill-driver
m. hammer drill
n. percussion hammer
o. vacuum cleaner Advantageously, the optical indicating device of the HMI module is matched to the functionality of the external application unit. Thus, the optical indicating device of the HMI module, when disposed on an angle grinder, indicates different parameters than when disposed on a jigsaw. For this reason, the HMI module is realized with a transparent, translucent cover layer, which is realized differently according to the particular application.

Further advantages and expedient embodiments are given by the description of the figures and the drawings.

BRIEF DESCRIPTION OF THE DRAWINGS

The drawings show the system according to the disclosure, the components according to the disclosure and the external application units according to the disclosure.

There are shown in.

DETAILED DESCRIPTION

Components that are the same in the differing exemplary embodiments are denoted by the same references.

Figure 1:
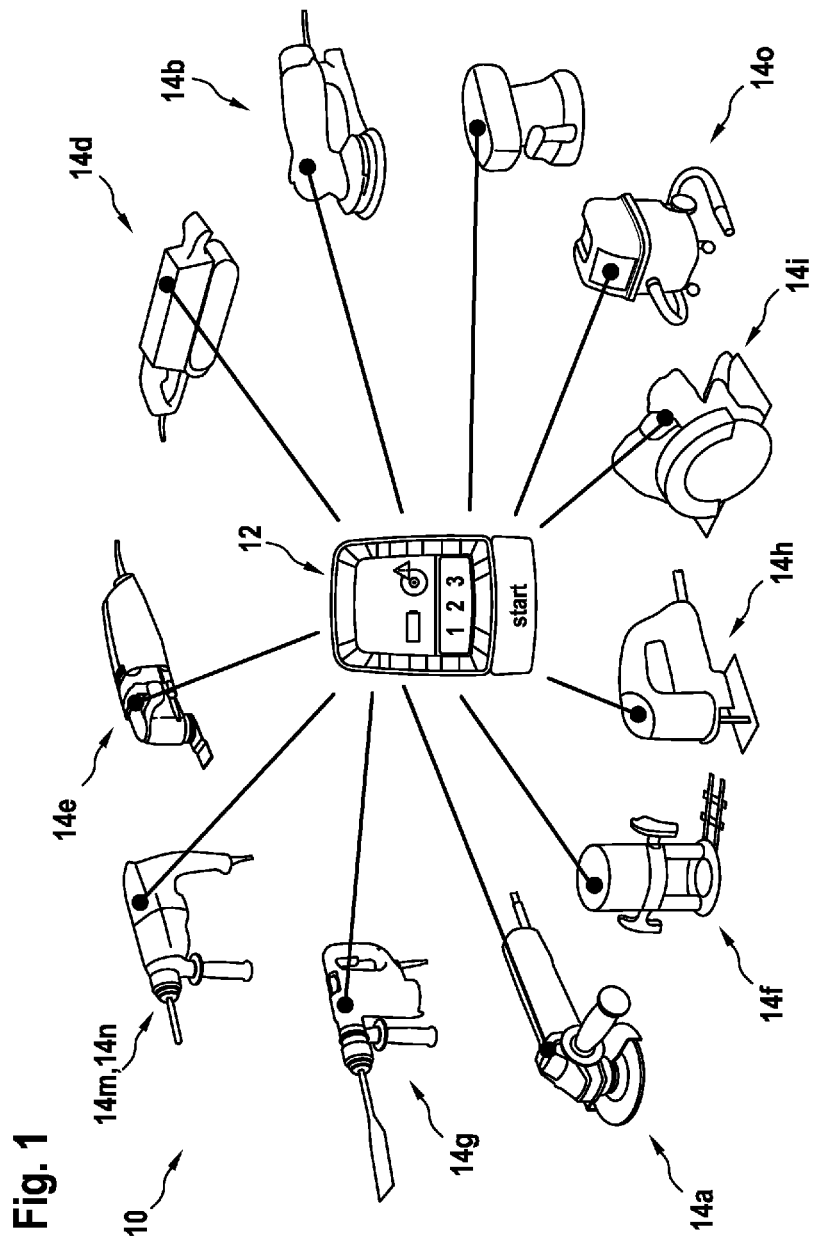
FIG. 1 the system according to the disclosure, having various external embodiments, in a schematic representation, FIG. 2 a first external embodiment according to the disclosure, having a HMI module, in a schematic representation, FIG. 3 a second external embodiment according to the disclosure, having the HMI module, in a schematic representation, FIG. 4 the HMI module according to the disclosure, in a schematic representation, FIG. 5 the system according to the disclosure, having various external embodiments, in a schematic representation, FIG. 6 an embodiment of the HMI module according to the disclosure, in a schematic representation.

FIG. 1 shows a system 10, which has a HMI module 12 and a plurality of external application units 14. The external application units 14 are preferably realized as hand-held power tools 14a to 14k.

Figure 2:
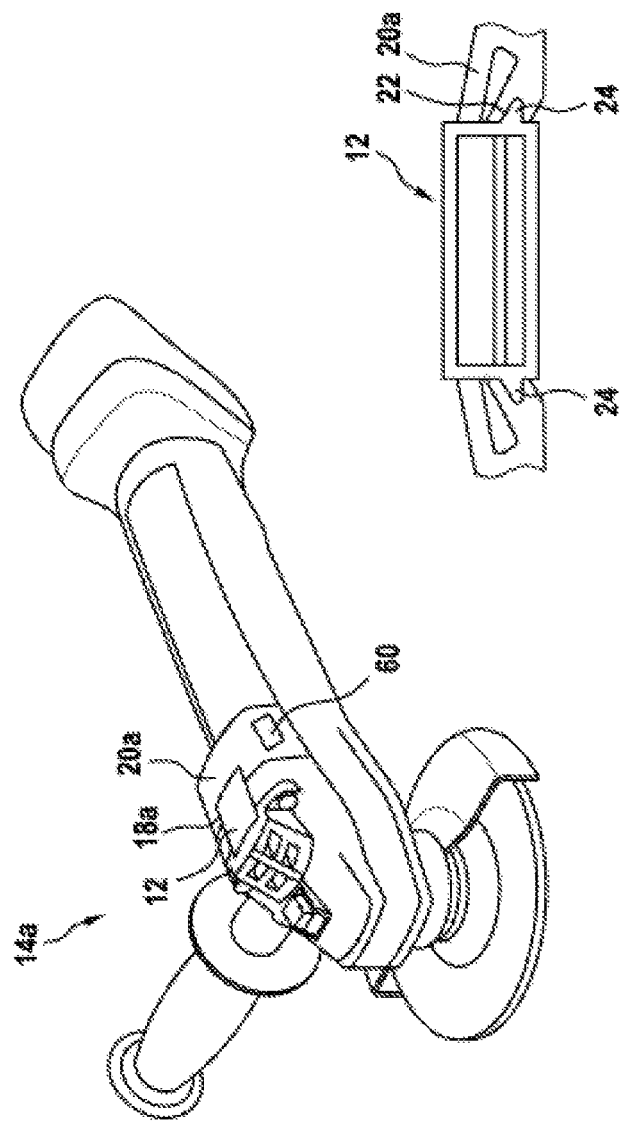

As shown by FIG. 2, the first external application unit 14a is realized as an angle grinder. The first external application unit 14a has a first interface 18a. The first interface 18a is designed to be connected to the HMI module 12.

Figure 3:
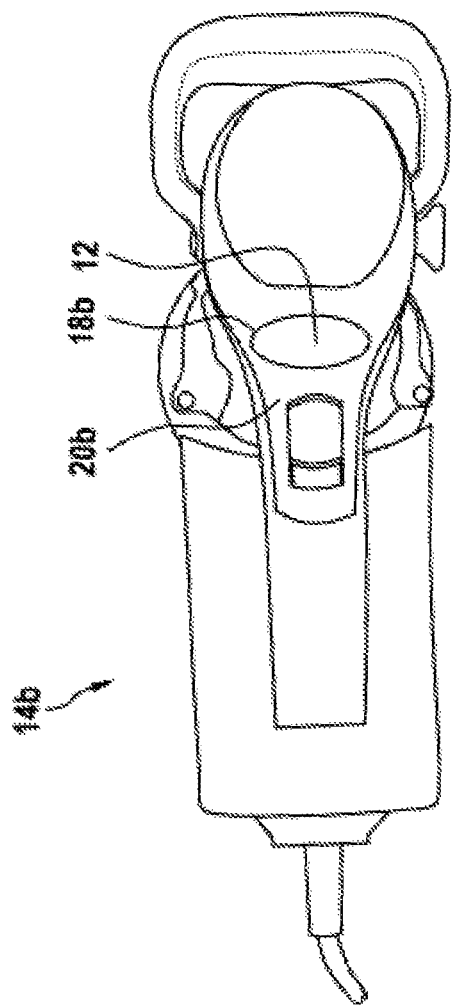

A second external application unit 14b is realized as a random-orbit sander, as shown in FIG. 3. The second external application unit 14b has a second interface 18b. The second interface 18b is designed to be connected to the HMI module 12.

In order to achieve a modular design, the first interface 18a and the second interface 18b are realized as mechanical interfaces.

The HMI module 12 may be connected both to the first interface 18a and to the second interface 18b. The HMI module 12 may be integrated in a form-fitting, materially bonded or force-fitting manner in the external application unit 14. For this purpose, the first external application unit 14a has a first housing 20. The first housing 20 has a recess 22. The HMI module is inserted through the recess of the first housing 20. Disposed on the HMI module 12 are undercuts 24, which fasten when the HMI module is mounted. However, the HMI module may also be adhesive-bonded, welded, riveted, or the like.

Figure 4:
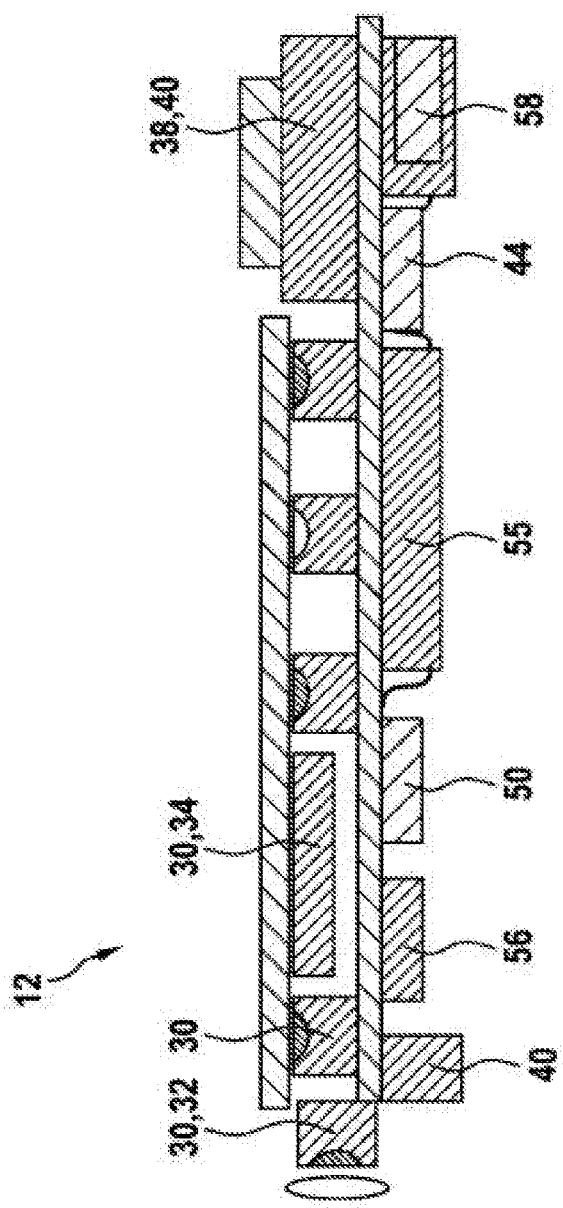

FIG. 4 shows a HMI module 12 in a schematic representation. As shown in FIG. 4, the HMI module 12 is equipped with an optical indicating device 30. The optical indicating device 30 is realized by an illumination device 32 and/or a display 34.

The illumination device 32 is disposed on the HMI module 12. The illumination device 32 is designed to visually indicate information by means of emission of visible light. In particular, an environment, in particular a work region, is illuminated.

The illumination device 32 in this case may realize the following indications:
Light, in particular having the following indications
a change in the light color
a change in the light intensity
light pulses of differing length
light pulses of differing brightness
running light, with change in the running direction of the light
light pulses, varying in pulse frequency and/or brightness A multiplicity of LEDs serve as a light source. The LEDs may be mounted on a circuit-board conductor by through-hole mounting. However, the LEDs may also be realized as SMD LEDs. The light emitted by the light source may have differing colors. The light emitted by the light source may vary in brightness. The light emitted by the light source may be a flashing light that periodically changes in brightness.

A display 34 visualizes information such as images or characters. The display of the optical indicating device shows information relating to parameters, such as a rotational speed, a temperature, a mode indication, or the like. The display 34 is disposed on the HMI module 12. The display 34 is designed to output optical information. Text, graphics, images and/or films can be output in this case. It is also conceivable, however, for the optical indicating device 30 to be a projection device, which projects optical information into an environment.

FIG. 4 shows that the HMI module 12 is equipped with an operating element 38. The operating element 38 in the exemplary embodiment is a switch 40. The switch 40 switches on the indicating device 30 of the HMI module 12. It is also possible, however, for the operating element to be an adjusting element or the like. The operating element 38 is disposed on the HMI module 12. However, the operating element 38 may also be disposed partly on the optical indicating device 30. The operating element 38 in this case may be realized such that it is integral with the optical indicating device 30. However, the may also be realized such that it is combined with the optical indicating device 30.

The HMI module 12 has a communication unit 40 for communicating electronic data. The communication unit 40 of the HMI module 12 is preferably realized as a wireless communication unit 40. The communication unit 40 in this case may be realized as a WLAN communication unit, as a Bluetooth communication unit, as a radio communication unit, as an RFID communication unit, as an NFC communication unit, as an infrared communication unit, as a mobile telephony communication unit, as a Zigbee communication unit, or the like. Particularly preferably, the communication unit 40 of the HMI module is designed for bidirectional data transmission. Preferably, communication is effected wirelessly between the communication unit 40 of the HMI module 12 and an external communication unit. The communication unit 40 is disposed on the HMI module 12. However, the communication unit 40 may also be disposed partly on the optical indicating device 30 or on the operating element 38. It is also conceivable, however, for the communication unit 40 to perform other functions, considered appropriate by persons skilled in the art.

In addition, the HMI module 12 is equipped with a sensor unit 44. The sensor module 44 is equipped with one or more sensors. The sensors are designed to sense a characteristic quantity that is to be determined, or a plurality of characteristic quantities that are to be determined, and to convert the same into a sensor signal or a plurality of sensor signals. The sensors in this case sense an environment-specific characteristic quantity, and/or a characteristic quantity relating to the external application unit 14, and provide a parameter relating to the environment and/or to the external application unit 14. The sensor module 44 in this case comprises at least one of the following sensors:
  a displacement sensor, which is designed to sense at least one displacement characteristic quantity, and which provides a parameter characterizing the displacement characteristic quantity,
  an acceleration sensor, which is designed to sense at least one acceleration characteristic quantity, and which provides a parameter characterizing the acceleration characteristic quantity,
  a motion detector, which is designed to sense at least one motion characteristic quantity, and which provides a parameter characterizing the motion characteristic quantity,
  a rotation-rate sensor, which is designed to sense at least one rotation characteristic quantity, and which provides a parameter characterizing the rotation characteristic quantity,
  a pressure sensor, which is designed to sense at least one pressure characteristic quantity, and which provides a parameter characterizing the pressure characteristic quantity,
  a humidity sensor, which is designed to sense at least one humidity characteristic quantity, and which provides a parameter characterizing the humidity characteristic quantity,
  a gas sensor, which is designed to sense at least one gas characteristic quantity, and which provides a parameter characterizing the gas characteristic quantity,
  a position sensor, which is designed to sense at least one position characteristic quantity, and which provides a parameter characterizing the position characteristic quantity,
  a light sensor, which is designed to sense at least one light characteristic quantity, and which provides a parameter characterizing the light characteristic quantity,
  a sound sensor, which is designed to sense at least one sound characteristic quantity, and which provides a parameter characterizing the sound characteristic quantity,
  a temperature sensor, which is designed to sense at least one temperature characteristic quantity, and which provides a parameter characterizing the temperature characteristic quantity,
  a magnetic field sensor, which is designed to sense at least one magnetic-field characteristic quantity, and which provides a parameter characterizing the magnetic-field characteristic quantity,
  a GPS sensor, which is designed to sense at least one GPS characteristic quantity, and which provides a parameter characterizing the GPS characteristic quantity.

The sensor module 44 is disposed on the HMI module 12. However, the sensor module 44 may also be disposed partly on the optical indicating device 30, on the operating element 38 or on the communication unit 40. It is also conceivable, however, for the sensor module 44 to perform other functions, considered appropriate by persons skilled in the art.

In addition, the HMI module 12 has at least one storage unit 50. The storage unit 50 is designed to store data, in particular electronic data, but preferably optical data. The storage unit 50 is disposed on the HMI module 12. However, the storage unit 50 may also be disposed partly on the optical indicating device 30, on the operating element 38, on the communication unit 40 or on the sensor module 44. It is also conceivable, however, for the storage unit 50 to perform other functions, considered appropriate by persons skilled in the art.

The HMI module 12 has a data processing unit 55. The data processing unit 55 is designed to store, manage, process and/or relay data, in particular electronic data, but preferably optical data. The data processing unit 55 is disposed on the HMI module 12. However, the data processing unit 55 may also be disposed partly on the optical indicating device 30, on the operating element 38, on the communication unit 40, on the sensor module 44 or on the storage unit 50. It is also conceivable, however, for the data processing unit 55 to perform other functions, considered appropriate by persons skilled in the art.

As can be seen in FIG. 4, the HMI module 12 has a rechargeable battery 56. The rechargeable battery 56 serves to supply energy for the HMI module 12. It is also conceivable, however, for the rechargeable battery 56 to perform other functions, considered appropriate by persons skilled in the art. The rechargeable battery 56 can be charged inductively, via a charging station.

The HMI module 12 has a plug-in contact 58. The plug-in contact 58 serves to supply energy to the HMI module 12 from the external application unit 14. Furthermore, the plug-in contact 58 may be designed as a data interface, to enable data to be exchanged between the HMI module 12 and the external application unit 14. In this case, UART, SPI, I²C or the like are conceivable as a data interface.

As can be seen in FIG. 2, the first external application unit 14a comprises an electronic unit 60. The electronic unit 60 is designed to control the external application unit 14a by open-loop and/or closed-loop control, to store, manage, process and/or relay electronic data, and/or to communicate with other electronic units. The HMI module 12 may be connected to the electronic unit 60 via a plug connector and/or a lead.

In FIG. 1, the external application units are realized as mains-operated hand-held power tools.

Figure 5:
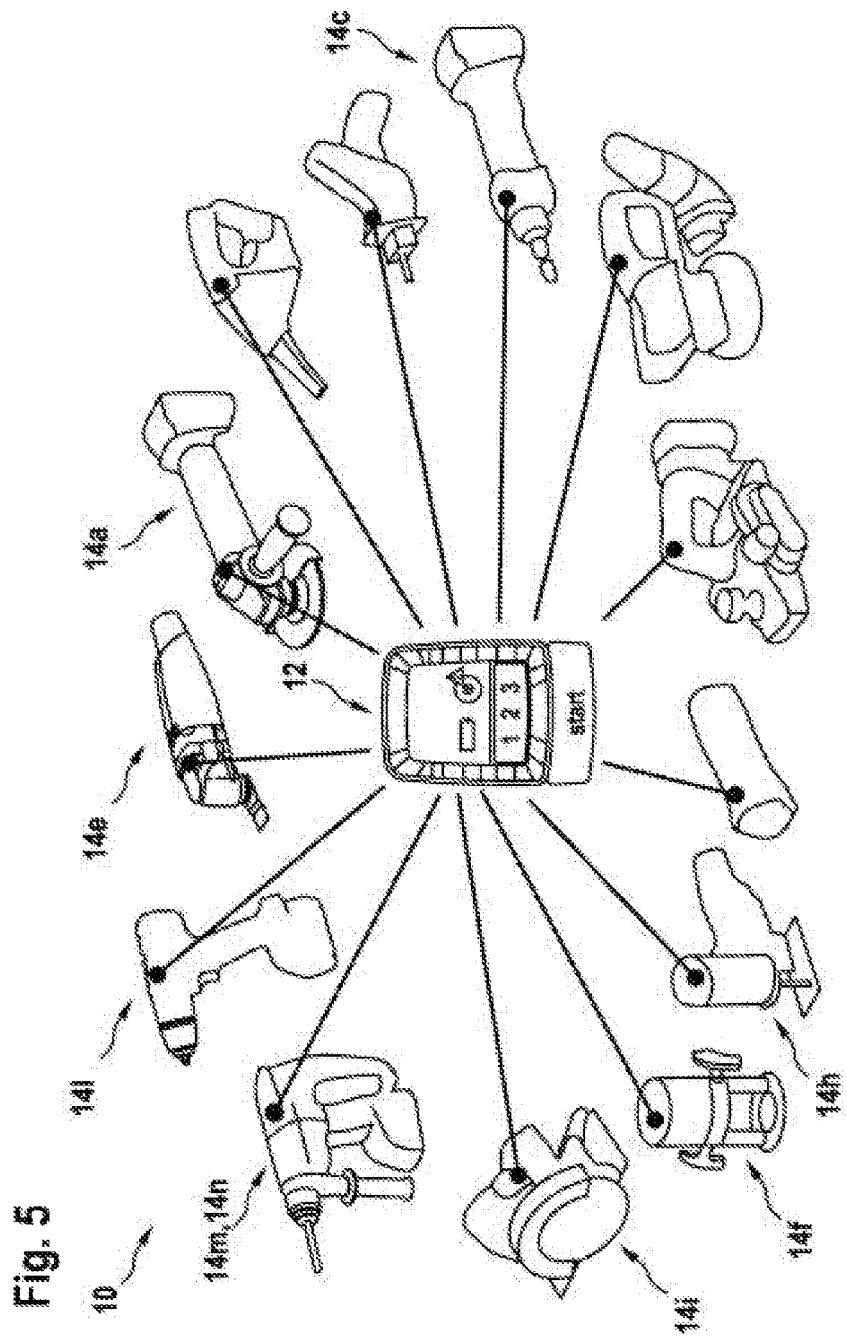

In FIG. 5, the external application units are realized as battery-operated hand-held power tools.

The hand-held power tools in this case are assigned to a hand-held power tool of the following group:
a. angle grinder (14a)
b. random-orbit sander (14b)
c. straight grinder (14c)
d. sander (14d)
e. oscillating multitool (14e)
f. router (14f)
g. electric scraper (14g)
h. jigsaw (14h)
i. circular saw (14i)
j. riveter (14j)
k. belt sander (14k)
l. screwdriver/drill-driver (14l)
m. hammer drill (14m)
n. percussion hammer (14n)
o. vacuum cleaner (14o)

Figure 6:
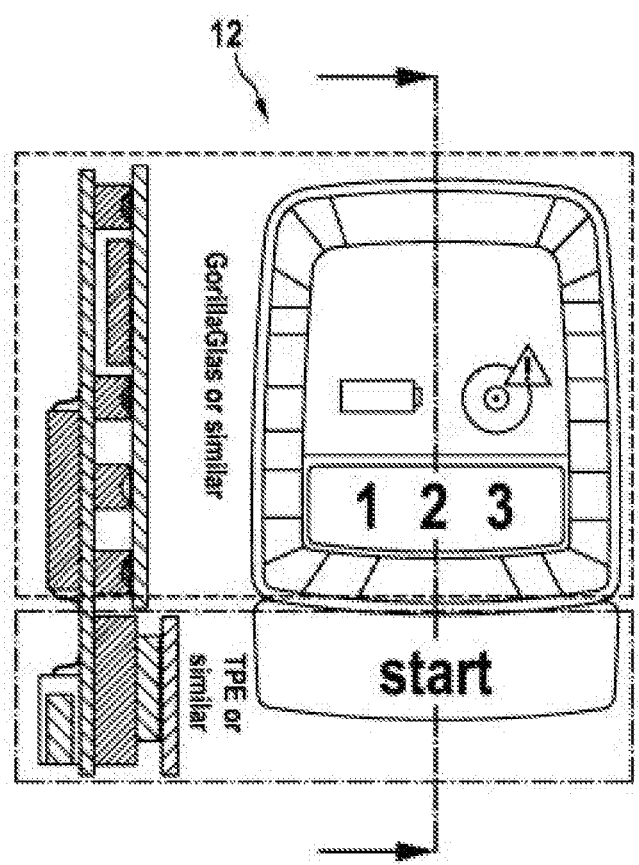

FIG. 6 shows the HMI module 12 in a preferred embodiment. In the embodiment according to the disclosure, the HMI module is of a rectangular design, with rounded corners. It is also conceivable, however, for the HMI module to be rectangular with angular corners, or oval. It is equally conceivable for the HMI module 12 to be realized in any other geometric shape, considered appropriate by persons skilled in the art.

The HMI module 12 may have differing optical indicating devices 30. Advantageously, the optical indicating device 30 of the HMI module 12 is matched to the functionality of the external application unit 14. Thus, the optical indicating device 30 of the HMI module 12, when disposed on an angle grinder 1a, indicates different parameters than when disposed on a jigsaw 14h. For this reason, the HMI module 12 is realized with a transparent, translucent cover layer, which is realized differently according to the particular application.

The invention claimed is:

1. A system comprising:
    at least one human-machine interface (HMI) module including a display and a projection device;
    at least one first external application unit including a housing and at least one first interface for the at least one HMI module; and
    at least one second external application unit including at least one second interface for the at least one HMI module,
    wherein the at least one HMI module is configured to correspond with the at least one first interface and the at least one second interface,
    wherein the at least one HMI module is welded to the housing when the at least one HMI module is corresponded with the at least one first interface,
    wherein the display is configured to display text, graphics, and images, and
    wherein the projection device is configured to project text, graphics, and images.

2. The system as claimed in claim 1, wherein the at least one first interface and the at least one second interface are mechanical interfaces.

3. The system as claimed in claim 2, wherein the at least one HMI module is further configured to be connected to a variety of external application units.

4. The system as claimed in claim 1, wherein the housing has a recess configured to receive the at least one HMI module.

5. The system as claimed in claim 1, wherein the at least one HMI module has at least one operating element.

6. The system as claimed in claim 1, wherein the at least one HMI module has at least one communication unit.

7. The system as claimed in claim 1, wherein the at least one HMI module has at least one sensor unit.

8. The system as claimed in claim 1, wherein the at least one HMI module has at least one storage unit.

9. The system as claimed in claim 1, wherein the at least one HMI module has at least one data processing unit.

10. The system as claimed in claim 1, wherein the at least one HMI module has at least one rechargeable battery.

11. The system as claimed in claim 1, wherein the at least one first external application unit further has at least one first electronic unit.

12. The system as claimed in claim 1, wherein the at least one first external application unit and the at least one second external application unit are mains-operated hand-held power tools.

13. The system as claimed in claim 1, wherein the at least one first external application unit and the at least one second external application unit are battery-operated hand-held power tools.

14. The system as claimed in claim 12, wherein the at least one first external application unit and the at least one second external application unit are at least one hand-held power tool of the following group: at least one of an angle grinder, a random-orbit sander, a straight grinder, a sander, an oscillating multitool, a router, an electric scraper, a jigsaw, a circular saw, a riveter, a belt sander, a screwdriver or a drill-driver, a hammer drill, a percussion hammer, and a vacuum cleaner.

15. The system as claimed in claim 1, wherein the at least one first external application unit is a first hand-held power tool.

16. The system as claimed in claim 15, wherein the at least one second external application unit is a second hand-held power tool.

17. The system as claimed in claim 7, wherein the at least one sensor unit includes a pressure sensor.

18. The system as claimed in claim 7, wherein the at least one sensor unit includes a humidity sensor.

* * * * *